No. 822,021. PATENTED MAY 29, 1906.
T. C. SANDERSON.
TIRE FOR VEHICLES AND THE PROCESS OF MAKING THE SAME.
APPLICATION FILED JULY 14, 1905.
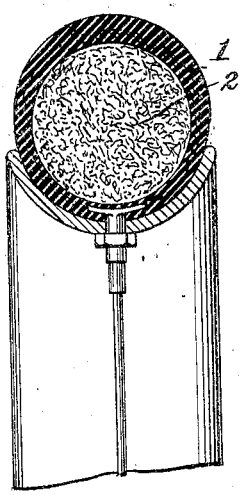
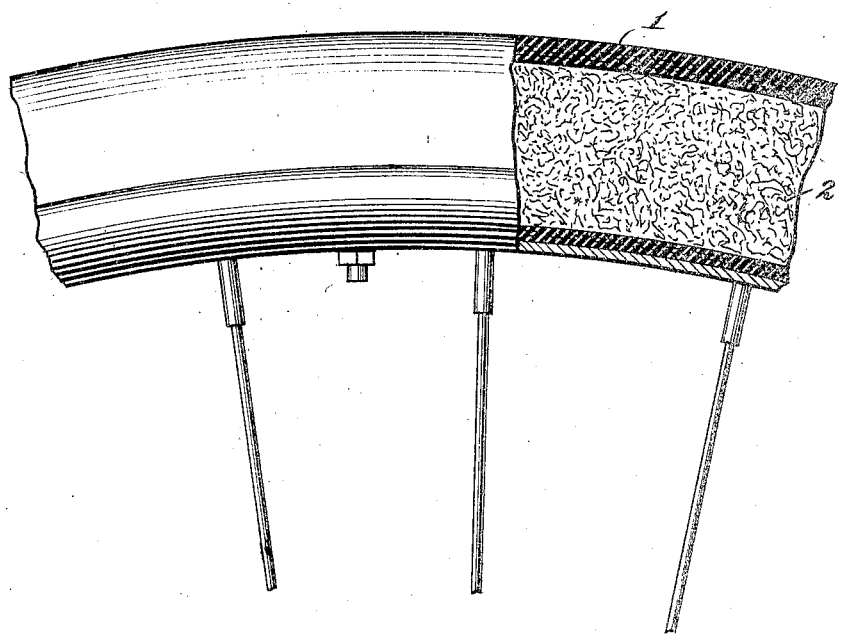
WITNESSES:
Emily G. Gravier
May C. McPike
INVENTOR
Thomas C. Sanderson
BY
Nicholas M Goodlett Jr
his ATTORNEY

UNITED STATES PATENT OFFICE.

THOMAS C. SANDERSON, OF WEST NEW BRIGHTON, NEW YORK.

TIRE FOR VEHICLES AND THE PROCESS OF MAKING THE SAME.

No. 822,021.  Specification of Letters Patent.  Patented May 29, 1906.

Application filed July 14, 1905. Serial No. 269,574.

*To all whom it may concern:*

Be it known that I, THOMAS C. SANDERSON, a subject of the King of England, and a resident of West New Brighton, in the county of Richmond, Staten Island, and State of New York, have invented certain new and useful Improvements in Tires for Vehicles and the Process of Making the Same, of which the following is a specification.

This invention relates to new and useful improvements in vehicle-tires and the process of making the same.

The invention seeks to provide a vehicle-tire by means of which deflation due to punctures will be prevented or largely obviated.

Prior to my invention tires have been made by surrounding a torus of crude rubber permeated with a decomposable chemical and then decomposing the chemical to expand the rubber into a spongy state and to fill the inclosing tire. They have also been made by forcing a semiliquid substance into an empty tire and allowing it to solidify into a homogeneous jelly-like mass.

On the other hand, my invention, although it contemplates providing a tire which has a core of sponge-rubber, this is accomplished by an improved process and results in a homogeneous core of sponge-rubber completely filling the inclosing tire-tube. The process employs a rubber already impregnated with an expansible gas under high pressure, which pressure is maintained until the tire-tube is filled and the rubber sets.

In the accompanying drawings, forming part of this specification, Figure 1 represents a transverse sectional elevation of the tire embodying my invention. Fig. 2 represents a side elevation of a portion of the tire, partly in section.

1 is an annular tube made of canvas, rubber, or other suitable materials or combinations thereof. The tube is filled with a suitable elastic cellular substance whose cells are filled with a compressed gaseous fluid. The annular tube 1 preferably consists of a single tube. The cellular substance with the gaseous fluid contained in its cells serves to maintain the tube in an inflated condition, and in case of puncture only a very slight or inappreciable change in the condition in the tire results. This is due to the fact that the contained gaseous fluid cannot escape from the cells except those open at and in the immediate neighborhood of the puncture. Rubber may be used as the cellular substance and it may be impregnated with the gaseous fluid under pressure in a suitable vessel while in a viscous or plastic state, so as to form it into a spongy cellular mass, the cells of which are filled with the compressed gaseous fluid. When the tube 1 is to be filled with this cellular substance, it is previously filled with a suitable compressed fluid, such as gas or air under pressure, and the cellular substance is forced into the tube at one aperture, while the compressed fluid within the tube is expelled at another aperture. The tube is thus filled with the cellular substance, the cells of which are filled with the gaseous fluid, and this fluid within the cells is not allowed to expand, because of the pressure of the compressed fluid or gas already in the tube.

What I claim, and desire to secure by Letters Patent, is—

1. The process of making a vehicle-tire which consists in forming a cellular mass containing a suitable gaseous fluid under pressure, filling an annular tube with a suitable compressed fluid, and forcing the cellular substance with its contained gaseous fluid into the annular tube and simultaneously expelling the fluid contained in the annular tube while maintaining the contained gaseous fluid under pressure.

2. The process of making a vehicle-tire which consists in forming a viscous cellular mass containing a suitable gaseous fluid under pressure, filling an annular tube with a suitable compressed fluid, forcing the cellular substance with its contained gaseous fluid into the annular tube and simultaneously expelling the fluid contained in the annular tube while maintaining the contained gaseous fluid under pressure and causing the viscous cellular mass to set before removing the pressure thereon.

In testimony whereof I have signed my name to this specification in the presence of two subscribing witnesses.

THOMAS C. SANDERSON.

Witnesses:
 KATHARINE MACMAHON,
 NICHOLAS M. GOODLETT, Jr.